(No Model.)
C. W. FOX.
SPATULA.
No. 479,937. Patented Aug. 2, 1892.
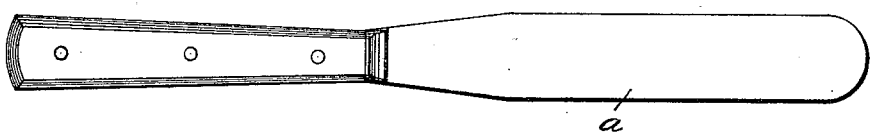
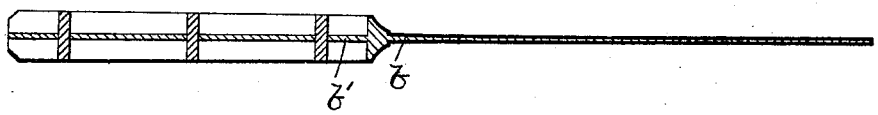
Witnesses
James L. Crandall
Lucy F. Graves.
Inventor.
Clarence W. Fox,
by B. J. Hayes
Atty.

UNITED STATES PATENT OFFICE.

CLARENCE W. FOX, OF SAUGUS, MASSACHUSETTS.

SPATULA.

SPECIFICATION forming part of Letters Patent No. 479,937, dated August 2, 1892.

Application filed May 19, 1892. Serial No. 433,616. (No model.)

*To all whom it may concern:*

Be it known that I, CLARENCE W. FOX, of Saugus, county of Essex, State of Massachusetts, have invented an Improvement in Spatulas, of which the following description, in connection with the accompanying drawings, is a specification, like letters on the drawings representing like parts.

Spatulas for druggists' use in mixing compounds, pigments, &c., have, so far as I am aware, been composed of a broad thin flexible blade of steel provided with a suitable handle. It frequently happens that the materials to be compounded act on the steel blade, and while injuring it the compound itself is also injured by the chemical action which takes place and not infrequently is said compound discolored. Spatula-blades have also been made of horn; but while such a blade can be used in some instances where a steel blade cannot many instances occur where a horn blade cannot be used, and, furthermore, a horn blade does not possess the required flexibility and is easily warped by changes in temperature, so that it is but little used. Spatula-blades have also been made of hard rubber; but as the blade must be very thin, in order to be sufficiently flexible, it is very easily broken.

This invention has for its object to construct a spatula which may be used without injuring the compound and also without injury to the blade, which latter possesses all the desirable qualities of a steel blade.

In accordance with this invention the blade of the spatula is made of rubber, provided with a broad thin steel core, to which is attached a handle, or said core may be suitably extended or formed to constitute the handle or may form a substantial part thereof.

Figure 1 shows in plan view a spatula embodying this invention; Fig. 2, a longitudinal section of the spatula shown in Fig. 1.

The blade $a$, of rubber, is made quite broad and thin and of suitable length and is provided with a broad thin steel core $b$. The core $b$ is extended at one end, as at $b'$, to form a substantial part of the handle, to each side of which suitably-shaped pieces of horn, wood, or other suitable material are attached. In lieu, however, of this particular form of handle it is obvious that any other suitable handle may be provided.

As a preferable way of manufacturing the blade the steel core is covered with rubber and the latter vulcanized thereon, yet in lieu of using rubber any well-known or suitable equivalent may be employed.

By making the blade of rubber with a steel core, as shown, it will be seen that it may be used without harm in mixing any compound, owing to the well-known qualities of the rubber to resist chemical action, and, furthermore, the steel core gives it the proper flexibility or spring-like action, while greatly increasing the durability of the blade, for without such core it would be easily broken.

I claim—

The spatula herein described, composed of a blade of rubber having a broad thin steel core and a handle, substantially as described.

In testimony whereof I have signed my name to this specification in the presence of two subscribing witnesses.

CLARENCE W. FOX.

Witnesses:
BERNICE J. NOYES,
LUCY F. GRAVES.